United States Patent
Fukushima et al.

(10) Patent No.: US 9,725,582 B2
(45) Date of Patent: Aug. 8, 2017

(54) FLUORORESIN COMPOSITION CONTAINING FLUORINATED NANO-DIAMOND

(71) Applicant: DAIKIN INDUSTRIES, LTD., Osaka-Shi, Osaka (JP)

(72) Inventors: Toshiyuki Fukushima, Settsu (JP); Takeshi Shimono, Settsu (JP); Tomohiro Isogai, Settsu (JP); Takahisa Aoyama, Settsu (JP); Fumihiko Yamaguchi, Settsu (JP); Tetsuo Shimizu, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/414,628

(22) PCT Filed: Aug. 9, 2013

(86) PCT No.: PCT/JP2013/071655
§ 371 (c)(1),
(2) Date: Jan. 13, 2015

(87) PCT Pub. No.: WO2014/027620
PCT Pub. Date: Feb. 20, 2014

(65) Prior Publication Data
US 2015/0166772 A1    Jun. 18, 2015

(30) Foreign Application Priority Data
Aug. 15, 2012 (JP) .................................. 2012-180244

(51) Int. Cl.
C08K 9/00 (2006.01)
C08K 9/02 (2006.01)

(52) U.S. Cl.
CPC ........................................ C08K 9/02 (2013.01)

(58) Field of Classification Search
CPC ........................................................ C08K 9/02
See application file for complete search history.

(56) References Cited

U.S. PATENT DOCUMENTS

| 5,473,018 | A | 12/1995 | Namura et al. |
| 6,465,577 | B2 * | 10/2002 | Okanishi ................. C08L 27/12 524/544 |
| 6,476,144 | B1 | 11/2002 | Okanishi |
| 2009/0023852 | A1 | 1/2009 | Tanaka et al. |
| 2010/0285303 | A1 | 11/2010 | Wu |

FOREIGN PATENT DOCUMENTS

| JP | 07-70397 A | 3/1995 |
| JP | 08-41267 A | 2/1996 |
| JP | 08-73689 A | 3/1996 |
| JP | 2001-151971 A | 6/2001 |
| JP | 2004-051937 A | 2/2004 |
| JP | 2006-131845 A | 5/2006 |
| JP | 2008-001812 A | 1/2008 |
| JP | 2010-261035 A | 11/2010 |
| WO | 99/62999 A1 | 12/1999 |
| WO | 2005/082998 A1 | 9/2005 |
| WO | 2005/085359 A1 | 9/2005 |

OTHER PUBLICATIONS

English translation of WO 2007/148667 (2007).*
International Preliminary Report n Patentability dated Feb. 17, 2015 from the International Searching Authority in counterpart Application No. PCT/JP2013/071655.
International Search Report of PCT/JP2013/071655 dated Nov. 12, 2013 [PVY/ISA/210].

* cited by examiner

*Primary Examiner* — Hannah Pak
(74) *Attorney, Agent, or Firm* — Sughrue Mion, PLLC

(57) ABSTRACT

The present invention aims to provide a fluororesin composition for a molded product that is excellent in tensile strength and flex resistance. The present invention relates to a fluororesin composition that contains a fluororesin and a fluorinated nanodiamond. The amount of the fluorinated nanodiamond is 0.001 to 5% by mass based on the fluororesin.

5 Claims, No Drawings

FLUORORESIN COMPOSITION CONTAINING FLUORINATED NANO-DIAMOND

CROSS REFERENCE TO RELATED APPLICATIONS

This application is a National Stage of International Application No. PCT/JP2013/071655, filed Aug. 9, 2013, claiming priority based on Japanese Patent Application No. 2012-180244, filed Aug. 15, 2012, the contents of all of which are incorporated herein by reference in their entirety.

TECHNICAL FIELD

The present invention relates to a fluororesin composition that contains a fluorinated nanodiamond.

BACKGROUND ART

Fluororesins are excellent in such properties as heat resistance, chemical resistance, and anti-stick properties and therefore used in a variety of applications. Various attempts have been made to modify fluororesins, which have such inherent excellent properties.

Patent Literature 1 teaches that incorporation of polytetrafluoroethylene which has a crystallization temperature of 305° C. or higher and a heat of crystallization of 50 J/g or higher into a melt-processable tetrafluoroethylene/fluoroalkoxytrifluoroethylene copolymer (PFA) composition, which is excellent in such properties as heat resistance and chemical resistance, markedly improves surface smoothness of a melt-excluded product of the PFA composition without impairing the properties of the PFA.

Patent Literature 2 teaches that a molded product of mixture of a tetrafluoroethylene/perfluoro(alkyl vinyl ether) copolymer (A) and a tetrafluoroethylene/perfluoro(alkyl vinyl ether) copolymer (B) that contains less perfluoro(alkyl vinyl ether)-derived polymer unit than the copolymer (A) has a reduced spherulite size and a smooth surface while maintaining inherent physical properties and formability of the PFA.

Patent Literature 3 discloses a method of producing a tetrafluoroethylene/perfluoro(alkyl vinyl ether) copolymer composition. The method includes copolymerization of tetrafluoroethylene and a perfluoro(alkyl vinyl ether) in a medium which contains a perfluoropolymer dispersed therein. Here, the perfluoropolymer comprises at least one selected from the group consisting of a tetrafluoroethylene/perfluoro(alkyl vinyl ether) copolymer (A) and a tetrafluoroethylene polymer (B), and has a volumetric flow rate (X) of 0.1 mm³/sec or higher. This copolymerization yields a tetrafluoroethylene/perfluoro(alkyl vinyl ether) copolymer (C) that contains more polymer units based on the 0.15 perfluoro(alkyl vinyl ether) than the copolymer (A), so that a composition comprising a mixture of the perfluoropolymer and the copolymer (C) is obtained. A PFA molded product obtained from this composition has a smaller spherulite size and a smooth surface while maintaining the inherent properties and formability of the PFA.

Patent Literature 4 teaches that a melt-molded product of a mixture of a melt-processable crystalline fluorine-containing resin with an amorphous fluorine-containing polymer or with a fluorine-containing multi-segmented polymer that contains an amorphous fluorine-containing polymer chain segment has a very smooth surface and decreases the probability of particle generation.

Patent Literature 5 teaches that a molded product of a mixture of a crystalline PFA with an amorphous fluorine-containing polymer has an improved surface smoothness and an improved transparency.

Patent Literature 6 teaches that incorporation of fluorinated diamond-containing particles into a fuser outer layer material containing a fluororesin allows a coating film that forms the outermost layer of a fuser component to have improved mechanical properties, surface abrasion resistance, and life.

CITATION LIST

Patent Literature

Patent Literature 1: JP H07-70397 A
Patent Literature 2: JP H08-41267 A
Patent Literature 3: JP H08-73689 A
Patent Literature 4: WO 99/62999
Patent Literature 5: JP 2001-151971 A
Patent Literature 6: JP 2010-261035 A

SUMMARY OF INVENTION

Technical Problem

In the conventional arts, additives are added to a tetrafluoroethylene/perfluoro(alkyl vinyl ether) copolymer (PFA) to improve surface smoothness of a molded product without sacrificing inherent excellent properties of the PFA. However, techniques for improving tensile strength and flex resistance of a molded product of fluororesin have not been reported.

In view of the situation in the art, the present invention aims to provide a fluororesin composition for a molded product that is excellent in tensile strength and flex resistance.

Solution to Problem

As a result of studies for solving the above problems, the present inventors have found that addition of a very limited amount of a fluorinated nanodiamond to a fluororesin improves tensile strength and flex resistance of the resulting molded product. Such a finding has led to the completion of the present invention.

Accordingly, the present invention relates to a fluororesin composition comprising a fluororesin and a fluorinated nanodiamond. The fluororesin composition contains the fluorinated nanodiamond in an amount of 0.001 to 5% by mass based on the fluororesin.

The fluororesin preferably comprises a melt-processable crystalline fluororesin.

The fluororesin composition may contain powder of the fluororesin and powder of the fluorinated nanodiamond.

The fluororesin composition may be obtainable by kneading the fluororesin and the fluorinated nanodiamond at a temperature higher than a melting point of the fluororesin.

The present invention also relates to a molded product comprising the fluororesin composition described above. The molded product preferably has a recrystallized average spherulite size of 15 μm or smaller, more preferably 6 μm or smaller, and still more preferably 1 μm or smaller.

Advantageous Effects of Invention

The composition of the present invention, which has the above features, can provide a fluororesin molded product excellent in tensile strength and flex resistance. The molded product of the present invention is excellent in tensile strength and flex resistance.

DESCRIPTION OF EMBODIMENTS

The present invention is described in detail below.

The fluororesin composition of the present invention contains a fluororesin and a fluorinated nanodiamond. The fluororesin composition contains the fluorinated nanodiamond in an amount of 0.001 to 5% by mass based on the fluororesin.

For improving tensile strength and flex resistance of a molded product of the fluororesin composition, it is important that the fluororesin composition contains the fluorinated nanodiamond in an amount of 0.001 to 5% by mass based on the fluororesin. The reason that addition of a fluorinated nanodiamond improves tensile strength and flex resistance of the fluororesin molded product is not clear, but is presumably that the fluorinated nanodiamond serves as a core to help formation of spherulites of the fluororesin while allowing the formed fluororesin spherulites to be small.

It is known that crystalline fluororesins form small spherulites under specific conditions, as taught in Patent Literatures 1 to 5. With the conventional art, however, improvement in tensile strength and flex resistance of the molded product is not possible, although improvement in the surface smoothness thereof has been achieved. This is because an increase in the concentration of additives generally deteriorates flex resistance. Use of a fluorinated nanodiamond, which is highly effective for reducing the size of the spherulites, allows the same average spherulite size as that of the conventional art to be achieved with a smaller amount of additives than required in the conventional art. Use of a fluorinated diamond presumably thus gives higher flex resistance than the conventional art.

Table 1 shows data which may support the presumption. Examples 1 to 6 in Table 1 show the size (recrystallized spherulite size) of spherulites that are formed when a molded product produced from the fluororesin composition of the present invention is molten and then cooled to be recrystallized. These results suggest that spherulites formed in a molded product of the fluororesin composition of the present invention are much smaller than those formed in fluororesin compositions free from fluorinated nanodiamond. Further, comparison with the average spherulite size disclosed in Patent Literature 1 shows that addition of a fluorinated nanodiamond results in smaller spherulites than addition of polytetrafluoroethylene even when the fluorinated nanodiamond is added in relatively smaller amounts.

Table 1 also shows the crystallization temperature of the fluororesin composition of the present invention. The fluororesin composition of the present invention has a higher crystallization temperature than a fluororesin composition free from a fluorinated nanodiamond. Even in comparison with a fluororesin composition that contains polytetrafluoroethylene, the fluororesin composition of the present invention has a high crystallization temperature as long as the amount of the fluorinated nanodiamond is the same as that of polytetrafluoroethylene. The crystallization temperature of the fluororesin composition that contains polytetrafluoroethylene is disclosed in Patent Literature 1.

Accordingly, the fluorinated nanodiamond in the fluororesin composition of the present invention are presumably well dispersed and allows spherulites to be effectively formed in the process of crystallization of fluororesin as compared with the conventional art.

The fluororesin composition of the present invention contains the fluorinated nanodiamond in an amount of 0.001 to 5% by mass based on the fluororesin. The amount of the fluorinated nanodiamond is preferably 0.005 to 4% by mass, more preferably 0.01 to 3% by mass, still more preferably 0.01 to 2% by mass, and particularly preferably 0.01 to 1% by mass. If the amount of the fluorinated nanodiamond is too large, effects commensurate with the amount are not provided, and tensile strength and flex resistance are impaired. If the amount of the fluorinated nanodiamond is too small, tensile strength and flex resistance are not improved.

The fluororesin preferably contains repeating units derived from at least one fluorine-containing ethylenic monomer selected from the group consisting of vinyl fluoride [VF], tetrafluoroethylene [TFE], vinylidene fluoride [VdF], chlorotrifluoroethylene [CTFE], hexafluoropropylene [HFP], hexafluoroisobutene, monomers represented by $CH_2=CZ^1(CF_2)_nZ^2$ (wherein $Z^1$ is H or F, $Z^2$ is H, F, or Cl, and n is an integer of 1 to 10), perfluoro(alkyl vinyl ether) [PAVE] represented by $CF_2=CF-ORf^1$ (wherein $Rf^1$ represents a C1 to C8 perfluoroalkyl group), and alkyl perfluorovinyl ether derivatives represented by $CF_2=CF-O-CH_2-Rf^2$ (wherein $Rf^2$ represents a C1 to C5 perfluoroalkyl group).

The fluororesin may contain repeating units derived from an ethylenic monomer that is free of a fluorine atom. In one preferred embodiment, the fluororesin contains repeating units derived from an ethylenic monomer that contains 5 or less carbons in view of maintaining such properties as heat resistance or chemical resistance. It is also preferred that the fluororesin contains at least one fluorine-free ethylenic monomer selected from the group consisting of ethylene [Et], propylene, 1-butene, 2-butene, vinyl chloride, vinylidene chloride, and unsaturated carboxylic acids.

The fluororesin is preferably a melt-processable crystalline fluororesin. The crystalline fluororesin herein means fluororesins which have a crystallization peak temperature when measured with a differential scanning calorimeter (DSC). Examples of the fluororesin include TFE/PAVE copolymer, TFE/HFP copolymer, TFE/Et copolymer, TFE/HFP/Et copolymer, TFE/HFP/VdF copolymer, TFE/PAVE/CTFE copolymer, CTFE/Et copolymer, polychlorotrifluoroethylene, polyvinylidene fluoride, and polyvinyl fluoride.

Among these fluororesins, TFE/PAVE copolymer (PFA) and TFE/HFP copolymer (FEP) are preferred, and TFE/PAVE copolymer (PFA) is more preferred.

The fluororesin preferably has a melting point of 100° C. to 347° C., and more preferably 150° C. to 322° C. The melting point may be determined as a melting peak temperature on a curve obtained using a differential scanning calorimeter (DSC).

The fluororesin preferably has a melt flow rate of 0.1 to 100 g/10 min, and more preferably 1 to 70 g/10 min. The melt flow rate may be determined in accordance with ASTM D3307-01 using a melt indexer (available from Toyo Seiki Seisaku-Sho, Ltd.).

The PFA is not particularly limited, and it is preferably a copolymer having a molar ratio of TFE units to PAVE units (TFE units/PAVE units) of 70 to 99/30 to 1. The molar ratio is more preferably 80 to 98.5/20 to 1.5. For significantly reducing the size of the spherulites, the molar ratio is still more preferably 97 to 98.5/3 to 1.5. If the amount of TFE units is too small, mechanical properties tend to be low. If the amount thereof is too large, the melting point tends to be too high, which tends to result in low moldability. The PFA is also preferably a copolymer which contains 0.1 to 10 mol % of a monomer unit derived from a monomer copolymerizable with TFE and PAVE and a total of 90 to 99.9 mol % of TFE units and PAVE units. Examples of the monomer copolymerizable with TFE and PAVE include HFP, vinyl monomers represented by $CZ^3Z^4\!=\!CZ^5(CF_2)_nZ^6$ (wherein $Z^3$, $Z^4$, and $Z^5$ may be the same as or different from one another, each representing a hydrogen atom or a fluorine atom, $Z^6$ represents a hydrogen atom, a fluorine atom, or a chlorine atom, and n represents an integer of 2 to 10), and alkyl perfluorovinyl ether derivatives represented by $CF_2\!=\!CF\!-\!OCH_2\!-\!Rf^7$ (wherein $Rf^7$ represents a C1 to C5 perfluoroalkyl group).

The FEP is not particularly limited, and it is preferably a copolymer which has a molar ratio of TFE units to HFP units (TFE units/HFP units) of 70 to 99/30 to 1. The molar ratio is more preferably 80 to 97/20 to 3. For significantly reducing the size of the spherulites, the molar ratio is still more preferably 91 to 97/9 to 3. If the amount of TFE units is too small, mechanical properties tend to be low. If the amount thereof is too large, the melting point tends to be too high, which tends to result in low moldability. The FEP is also preferably a copolymer which contains 0.1 to 10 mol % of a monomer unit derived from a monomer copolymerizable with TFE and HFP and a total of 90 to 99.9 mol % of TFE units and HFP units. Examples of the monomer copolymerizable with TFE and HFP include PAVE and alkyl perfluorovinyl ether derivatives.

The amounts of each monomer in the above copolymers may be determined by appropriately combining NMR, FT-IR, elemental analysis, and X-ray fluorescence analysis depending on the kind of the monomer.

The fluorinated nanodiamond is preferably obtainable by fluorination of a nanodiamond which is obtained by an explosion method. A crude nanodiamond obtained by an explosion method has a core/shell structure in which graphitic carbon covers the surface of a nanodiamond, and is thus colored black. A crude nanodiamond may be used. For achieving a molded product with a reduced color, it is preferred that a crude nanodiamond is used after oxidation to remove part or almost all of the graphite phase.

The fluorination of the nanodiamond may be performed by, for example, a known method disclosed in Dai nijyu rokkai Fusso Kagaku Toronkai Yoshishu (Abstract of the 26th Fluorine Conference of Japan), Nov. 14, 2002, pp 24-25. That is, the nanodiamond may be fluorinated by sealing it in a reactor that is made of a material having corrosion resistance to fluorine, such as nickel or nickel-containing alloys, and introducing fluorine gas to the reactor.

The fluorination reaction pressure is preferably 0.002 to 1.0 MPa. If the pressure is too small, the rate of fluorination is low. If the pressure is too high, a large-scale apparatus is required, which results in low productivity and low economic efficiency. The fluorination reaction pressure is more preferably 0.005 to 0.2 MPa.

The gas to be used for fluorination preferably has a purity as high as possible. The gas has a fluorine concentration of at least 1.0% by mass and may be diluted with 99% by mass or less of nitrogen, argon, helium, or the like. The concentration of the gas for fluorination may be varied during the reaction as needed, but is more preferably 10% by mass or more in view of productivity.

The gas for fluorination may contain fluorocarbons such as tetrafluoroethane and hexafluoroethane, inorganic fluorides such as hydrogen fluoride, nitrogen trifluoride, and iodine pentafluoride, oxygen, water vapor, and the like. In particular, hydrogen fluoride may be actively added because it is known in fluorination of graphite that gas containing a small amount of hydrogen fluoride can increase the rate of reaction due to catalytic effect of the hydrogen fluoride.

The fluorination reaction may be performed in a reactor that has a sufficient volume in a batch process or a semi-batch process under fluorine gas purge as needed. Alternatively, the reaction may be performed in a continuous flow system. If a large amount of nanodiamond is fluorinated at one time, a proper stirring mechanism is preferably provided to homogenize the reaction. Examples of the stirring mechanism include stirring using various stirring blades, mechanically rotating or vibrating the reactor, and fluidizing the layer of nanodiamond powder by flowing gas through the layer. Care should be taken to excessive stirring, which may cause dust explosion.

The fluorination reaction temperature is selected from the range of −100° C. to 600° C. considering productivity, economic efficiency, and safety. The fluorination reaction temperature is preferably within the range of room temperature (25° C.) to 350° C., and still more preferably room temperature to 300° C. If the reaction temperature is too low, the rate of fluorination is low. If the reaction temperature is too high, decomposition reaction of nanodiamond proceeds faster, requiring attention.

The reaction time is not particularly limited, and preferably appropriately set within the range of 10 seconds to 1000 hours depending on the mode and conditions of the reaction. If the reaction time is too short, it is difficult to sufficiently fluorinate the nanodiamond, and effects of the fluorination tends to be insufficient. If the reaction time is too long, decomposition reaction of nanodiamond is promoted. In addition, the reaction takes a long time, thus reducing industrial production efficiency.

The obtained fluorinated nanodiamond preferably has a fluorine content determined by elemental analysis (oxygen-flask method) of 0.1 to 20.0% by mass. If the fluorine content is small, effects of the fluorination are insufficient. If the fluorine content is too large, the fluorinated diamond does not give its effect as a nanodiamond.

The fluorine content is more preferably 1.0% by mass or more and still more preferably 5.0% by mass or more, and also more preferably 10.0% by mass or less.

The form of the fluororesin composition of the present invention is not particularly limited. The fluororesin composition may be in the form of powder, a pellet, a bead, a dispersion, or the like. If the fluororesin composition is in the form of a dispersion, it can be used as a coating material to form a coating film. However, since an effect of the present invention is to improve tensile strength and flex resistance of a molded product, the fluororesin composition of the present invention is preferably in a form that facilitates production of a molded product, that is, a form of powder, a pellet, or a bead. For the same reason, the fluororesin composition of the present invention is preferably a molding material, and more preferably a molding material intended to be used in extrusion molding, injection molding, compression molding, blow molding, vacuum molding, transfer molding, casting, injection compression molding, insert molding, inflation molding, and the like.

The fluororesin composition of the present invention may be produced by dry mixing a fluororesin and a fluorinated nanodiamond, may be produced by adding a fluorinated nanodiamond to an aqueous dispersion of a fluororesin and co-coagulating the mixture, or may be produced by melt-kneading a fluororesin and a fluorinated nanodiamond at a temperature higher than the melting point of the fluororesin. The melt-kneading may be performed by a known method using a kneader, an extruder, or the like. The composition obtained by melt-kneading may be in the form of a pellet or a bead. Alternatively, the composition may be in the form of powder obtained by pulverizing such a pellet or a bead.

The fluororesin composition of the present invention can be particularly suitably produced by a production method that includes: dry mixing the fluororesin and the fluorinated nanodiamond to prepare a powder mix; melt-kneading the powder mix and another portion of the fluororesin at a temperature higher than the melting point of the fluororesin to prepare a masterbatch; and melt-kneading the masterbatch with another portion of the fluororesin at a temperature higher than the melting point of the fluororesin to provide a fluororesin composition that has the desired composition.

The fluororesin composition of the present invention may be a powder mix of a fluororesin and a fluorinated nanodiamond. Powder of the fluororesin preferably has an average particle size of 50 to 1000 μm. Powder of the fluorinated nanodiamond preferably has an average particle size of 1 to 1000 nm, and more preferably 1 to 100 nm. The average particle size can be easily determined with, for example, a laser light scattering particle size distribution meter. The powder may be supplied as is to the measurement, or a dispersion of the powder in a proper organic solvent such as 2-butanone may be subjected to the measurement. In the case of a molded product in which the nanodiamond powder is dispersed in a resin, particle size distribution can be estimated by taking an image of the dispersing state of the fluorinated nanodiamond with a scanning electron microscope or a transmission electron microscope and appropriately processing the image. Here, when a transmission electron microscope is used, the molded product is preliminarily sliced with a microtome. A molded product may be directly produced from the powder mix by extrusion molding or the like method, or may be produced from a kneaded product prepared by melt-kneading the powder mix with a kneader.

The fluororesin composition of the present invention may be obtainable by kneading a fluororesin and a fluorinated nanodiamond at a temperature higher than the melting point of the fluororesin. In such a composition, the fluorinated nanodiamond is dispersed in the fluororesin. Dispersion of the fluorinated nanodiamond in the fluororesin may be observed with a scanning electron microscope or a transmission electron microscope. Here, when a transmission electron microscope is used, the molded product is preliminarily sliced with a microtome. Further, the dispersion may be confirmed by detecting a peak specific to a nanodiamond core (1332 to 1325 $cm^{-1}$), which appears at a different position from the peak of the fluororesin, by laser Raman spectroscopy and by detecting a peak specific to fluorinated graphite fraction (around 288 eV) by X-ray photoelectron spectroscopy (XPS).

The fluororesin composition of the present invention may contain additives such as a flame retardant, a stabilizer, an ultraviolet absorber, a light stabilizer, an antistatic agent, a conductivity imparting agent, a nucleating agent, a lubricant, filler, a dispersing agent, a metal deactivator, a neutralizing agent, a processing aid, a mold-release agent, a foaming agent, a colorant, and a fingerprint preventing agent. The fluororesin composition of the present invention can contain the additives in an amount that does not impair the effects of the present invention. The fluororesin composition of the present invention may contain additives in an amount of 0.001 to 1.000% by mass based on the total mass of the fluororesin and the fluorinated nanodiamond.

The fluororesin composition of the present invention preferably contains the fluororesin and the fluorinated nanodiamond in an amount of 99.000 to 99.999% by mass. The mass ratio of the fluororesin to the fluorinated nanodiamond is preferably 99.999/0.001 to 97.000/3.000. The fluororesin composition of the present invention is preferably substantially free of water. More preferably, it contains not more than 1.000% by mass of water.

The present invention also relates to a molded product that comprises the above fluororesin composition. Since obtained by molding the fluororesin composition, the molded product of the present invention is excellent in tensile strength and flex resistance. The way of molding the fluororesin composition is not particularly limited. Examples thereof include extrusion molding, injection molding, compression molding, blow molding, vacuum molding, transfer molding, casting, injection compression molding, insert molding, and inflation molding.

The molded product of the present invention preferably has a recrystallized average spherulite size of 15 μm or smaller, more preferably 6 μm or smaller, and still more preferably 1 μm or smaller. The smaller the recrystallized average spherulite size is, the better tensile strength and durability are. The recrystallized average spherulite size may be determined as follows. A specimen having a thickness of about 0.1 mm is cut out of a molded product obtained by melt-kneading a fluororesin and a fluorinated nanodiamond. The specimen was placed on a microscope stage (available from Linkam Scientific Instruments, TST350) and heated from room temperature to 350° C. at a rate of 40° C./min, held at 350° C. for 5 minutes, then cooled to 200° C. at a rate of 10° C./min, and further cooled to room temperature at a rate of 30° C./min. The surface of the cooled specimen is observed with a polarizing microscope (available from Olympus Corp., BX51) and a scanning electron microscope (available from Hitachi, Ltd., S-4000). The average diameter of contiguous 60 spherulites is determined as the recrystallized average spherulite size.

According to the present invention, a molded product having a MIT value of 150,000 times or greater can be obtained. The MIT value may be measured with a standard folding endurance tester complying with ASTM D-2176.

The form of the molded product of present invention is not particularly limited. Examples thereof include forms of films, sheets, plates, rods, blocks, cylinders, containers, wires, and tubes.

Though the molded product of the present invention can be used in typical applications of fluororesin molded products, it will be particularly suitably used as a molding material for sealing materials, chemical tubes, chemical bottles, fuel tubes, nuts, valve bodies, union joints, diaphragms, bellows, and sleeves, in view of its excellent tensile strength and flex resistance. Further, since it is transparent and excellent in heat resistance, it is also suitable for use as sight glass of reaction containers. It is also suitably used in fields requiring high purity chemicals and ultrapure water, such as semiconductor manufacturing fields.

EXAMPLES

The present invention is described with reference to examples below. The present invention is not limited to the examples.

The parameters of the examples are determined by the following methods.

Melting Point and Crystallization Temperature

Three milligrams of each of the samples for determining physical properties obtained in examples and comparative examples was heated to 350° C. at a rate of temperature rise of 10° C./min and then cooled to 200° C. at a cooling rate of 10° C./min with a differential calorimeter (available from METTLER TOLEDO). The crystallization temperature was determined from a crystallization peak generated in the process. The melting point was determined from a melting peak generated in the temperature rise process from 200° C. to 350° C.

Recrystallized maximum spherulite size, recrystallized average spherulite size, recrystallized minimum spherulite size Specimens (thickness: about 0.1 mm) were cut out of samples for determining physical properties obtained in examples and comparative examples. Each of the specimens was placed on a microscope stage (available from Linkam Scientific Instruments, TST350) and heated from room temperature to 350° C. at a rate of 40° C./min, held at 350° C. for 5 minutes, then cooled to 200° C. at 10° C./min, and further cooled to room temperature at 30° C./min. The surface of the obtained specimen was observed with a polarizing microscope (available from Olympus Corp., BX51) and a scanning electron microscope (available from Hitachi, Ltd., S-4000). The average diameter of contiguous 60 spherulites was determined as the average spherulite size. The largest spherulite diameter of the 60 samples was taken as the maximum spherulite size, and the smallest spherulite diameter of the diameters of the 60 samples was taken as the minimum spherulite size.

MIT

Each of the samples for determining physical properties obtained in examples and comparative examples was heated for 20 minutes in a metal mold heated to 360° C. on a hot press. Thereafter, the sample was pressurized at a pressure of about 45 kgf/cm$^2$ for 3 minutes, then transferred onto a press at room temperature and pressurized to about 45 kgf/cm$^2$, and allowed to stand for 15 minutes to be cooled. A compression molded film having a thickness of 0.20 to 0.23 mm was thus prepared. A specimen having a length of about 90 mm and a breadth of about 13 mm was cut out of the film. The MIT value herein is determined by subjecting the specimen to a measurement in accordance with ASTM D2176. The measurement is performed with a MIT folding endurance tester (available from Yasuda Seiki Seisakusho Ltd.) at a load of 9.8 N, a folding frequency of 175 times/min, and a folding angle of 135°. The average value of five measurements is taken as the MIT value herein.

Tensile Strength and Tensile Elongation

Each of the samples for determining physical properties obtained in examples and comparative examples was heated for 30 minutes in a metal mold heated to 360° C. on a hot press. Thereafter, the sample was pressurized at a pressure of about 25 kgf/cm$^2$ for 3 minutes, then transferred onto a press at room temperature and pressurized to about 25 kgf/cm$^2$, and allowed to stand for 15 minutes to be cooled. A sheet was thus prepared. The tensile strength and the tensile elongation herein are determined by subjecting a compression-molded sheet (thickness: 2.0 mm) prepared in the above manner to a tensile test in accordance with ASTM D3307. The test is performed using a tensilon universal tester (available from ORIENTIC, RTC-1225A) at chuck distance of 22.5 mm and a crosshead speed of 50 mm/min. The tensile strength and tensile elongation herein are each defined as the average value of five measurements.

Preparation Example 1: Preparation of Fluorinated Nanodiamond

A nanodiamond (primary particle size: 4 to 6 nm, specific surface area: 250 to 350 m$^2$/g, purity: 90% by weight or higher) synthesized by an explosion method was used.

The nanodiamond (10.0 g) was placed on a nickel dish and sealed in a nickel reaction vessel (internal volume: about 2000 cm$^2$). Thereafter, high purity nitrogen gas (purity: 99.999%) was flowed through the inside of the reaction vessel at a flow rate of 300 ml/min, so that the air in the reaction vessel was sufficiently replaced with the gas. The reaction vessel was then heated to 250° C. under flowing the high purity nitrogen gas. When the temperature within the reaction vessel was stabilized, a mixed gas (fluorine concentration: 15% by volume or less) of high purity fluorine gas (purity: 99.5%) and high purity nitrogen gas was flowed through the vessel at a flow rate of 300 ml/min or lower. After heat generation accompanying fluorine gas occlusion subsided and stabilized, the concentration of the fluorine gas was gradually increased to 100% while attention was made to rapid increase of the reaction temperature. Thereafter, flow of fluorine gas was stopped, and pressure change in the reaction vessel was monitored. It was confirmed that pressure change reached 0.5 kPa/h or lower, whereby fluorination was considered complete. After the termination of reaction, the reaction vessel was allowed to come to 35° C. or lower. High purity nitrogen gas was flowed at a flow rate of 300 ml/min for 30 minutes or longer, so that fluorine gas remaining inside of the reaction vessel was sufficiently replaced with the nitrogen gas. The reaction vessel was then opened, and grayish white fluorinated diamond (mass: 9.72 g) except for that sticking to the nickel dish or scattered inside or outside the reaction vessel was collected and preserved in a glass container.

The obtained fluorinated nanodiamond had a fluorine content of 9.1% by mass. Elemental analysis thereof showed that the hydrogen content, the carbon content and the nitrogen content were respectively H: 0.32, C: 86.49, and N: 2.56 (% by mass). An XPS measurement showed that F/C was 0.20 and O/C was 0.1 or lower.

Examples 1 to 3

Tetrafluoroethylene/perfluoro(alkyl vinyl ether) copolymer (PFA) powder (PPVE content: 1.5 mol %, MFR: 15.0 g/10 min, melting point: 304.1° C.) and the fluorinated nanodiamond prepared in the above manner were mixed at room temperature for 3 minutes using a Millser for domestic use (trade name: IMF-800DG, available from IWATANI Corporation) such that the amount of the fluorinated nanodiamond was 1% by mass based on the PFA. Thereafter, the mixture was kneaded using Labo Plasto Mill (Toyo Seiki Seisaku-Sho, Ltd. product number: 100C100) at 350° C. for 10 minutes to prepare a masterbatch. The prepared masterbatch was mixed with another portion of the PFA powder at 350° C. for 10 minutes such that the amount of the fluorinated nanodiamond based on the PFA shown in Table 1 was achieved. A sample for determining physical properties was thus obtained. The melting point, the crystallization temperature, the spherulite size, the MIT, the tensile strength, and the tensile elongation were shown in Table 1.

Example 4

Tetrafluoroethylene/perfluoro(alkyl vinyl ether) copolymer (PFA) powder (PPVE content: 1.5 mol %, MFR: 15.0 g/10 min, melting point: 304.1° C.) and the fluorinated nanodiamond prepared in the above manner were mixed at room temperature for 3 minutes using a Millser for domestic use (trade name: IMF-800DG, available from IWATANI Corporation) such that the amount of the fluorinated nanodiamond was 2.00% by mass based on the PFA. Thereafter, the mixture was kneaded using Labo Plasto Mill (Toyo Seiki Seisaku-Sho, Ltd. product number: 100C100) at 350° C. for 10 minutes. A sample for determining physical properties was thus obtained. The melting point, the crystallization temperature, the spherulite size, the MIT, the tensile strength, and the tensile elongation were shown in Table 1.

Example 5

Tetrafluoroethylene/perfluoro(alkyl vinyl ether) copolymer (PFA) powder (PPVE content: 1.5 mol %, MFR: 15.0 g/10 min, melting point: 304.1° C.) and the fluorinated nanodiamond prepared in the above manner were mixed at room temperature for 3 minutes using a Millser for domestic use (trade name: IMF-800DG, available from IWATANI Corporation) such that the amount of the fluorinated nanodiamond was 3.00% by mass based on the PFA. Thereafter, the mixture was kneaded using Labo Plasto Mill (Toyo Seiki Seisaku-Sho, Ltd. product number: 100C100) at 350° C. for 10 minutes. A sample for determining physical properties was thus obtained. The melting point, the crystallization temperature, the spherulite size, the MIT, the tensile strength, and the tensile elongation were shown in Table 1.

Example 6

Tetrafluoroethylene/perfluoro(alkyl vinyl ether) copolymer (PFA) powder (PPVE content: 1.5 mol %, MFR: 15.0 g/10 min, melting point: 304.1° C.) and the fluorinated nanodiamond prepared in the above manner were mixed at room temperature for 3 minutes using a Millser for domestic use (trade name: IMF-800DG, available from IWATANI Corporation) such that the amount of the fluorinated nanodiamond was 5.00% by mass based on the PFA. Thereafter, the mixture was kneaded using Labo Plasto Mill (Toyo Seiki Seisaku-Sho, Ltd. product number: 100C100) at 350° C. for 10 minutes. A sample for determining physical properties was thus obtained. The melting point, the crystallization temperature, the spherulite size, the MIT, the tensile strength, and the tensile elongation were shown in Table 1.

Comparative Example 1

A sample for determining physical properties was obtained in the same manner as in Examples 1 to 3 except that no fluorinated nanodiamond was added to the PFA. The results are shown in Table 1.

Comparative Example 2

Tetrafluoroethylene/perfluoro(alkyl vinyl ether) copolymer (PFA) powder (PPVE content: 1.5 mol %, MFR: 15.0 g/10 min, melting point: 304.1° C.) and the fluorinated nanodiamond prepared in the above manner were mixed at room temperature for 3 minutes using a Millser for domestic use (trade name: IMF-800DG, available from IWATANI Corporation) such that the amount of the fluorinated nanodiamond was 10% by mass based on the PFA. Thereafter, the mixture was kneaded using Labo Plasto Mill (Toyo Seiki Seisaku-Sho, Ltd. product number: 100C100) at 350° C. for 10 minutes. A sample for determining physical properties was thus obtained. The results are shown in Table 1.

TABLE 1

| | Fluorinated nanodiamond (% by mass) | Melting point (° C.) | Crystallization temperature (° C.) | Maximum spherulite size (μm) | Average spherulite size (μm) | Minimum spherulite size (μm) | Tensile strength (MPa) | Tensile elongation (%) | MIT (times) |
|---|---|---|---|---|---|---|---|---|---|
| Comparative Example 1 | 0 | 304.1 | 277.5 | 64 | 40 | 19 | 25.0 | 393 | 15809 |
| Example 1 | 0.01 | 306.6 | 285.8 | 7.8 | 5.8 | 3.7 | 26.6 | 372 | 43440 |
| Example 2 | 0.10 | 306.1 | 288.4 | 1.9 | 1.6 | 1.4 | 26.8 | 356 | 87454 |
| Example 3 | 1.00 | 307.4 | 291.6 | 0.9 | 0.8 | 0.6 | 28.5 | 362 | 157767 |
| Example 4 | 2.00 | 308.6 | 293.8 | 0.3 | 0.2 | 0.2 | 29.0 | 386 | 63399 |
| Example 5 | 3.00 | 310.1 | 293.9 | 0.1 | 0.1 | 0.1 | 29.2 | 376 | 29205 |
| Example 6 | 5.00 | 308.4 | 298.8 | 0.2 | 0.2 | 0.2 | 29.0 | 376 | 25802 |
| Comparative Example 2 | 10 | 310 | 295 | 0.8 | 0.7 | 0.6 | 24.1 | 299 | 10492 |

Table 1 shows that while PFA with no fluorinated nanodiamond had a recrystallized average spherulite size of 40 μm, addition of 0.01% by mass of a fluorinated nanodiamond to PFA resulted in a finer average spherulite size of 6 μm or smaller, addition of 0.1% by mass of a fluorinated nanodiamond to PFA resulted in a finer average spherulite size of 2 μm or smaller, and addition of 1% by mass of a fluorinated nanodiamond to PFA resulted in a finer average spherulite size of 1 μm or smaller. Thus, addition of a fluorinated nanodiamond to PFA clearly gave an effect of reducing the size of the spherulites.

Table 1 shows that while PFA with no fluorinated nanodiamond had a tensile strength of 25.0 MPa and a MIT value of about 16,000 times, addition of 0.01% by mass of a fluorinated nanodiamond to PFA resulted in an increased tensile strength of 26.6 MPa and an increased MIT value of about 43,000 times, addition of 0.1% by mass of a fluorinated nanodiamond to PFA resulted in an increased tensile strength of 26.8 MPa and an increased MIT value of about 88,000 times, and addition of 1% by mass of a fluorinated nanodiamond to PFA resulted in an increased tensile strength of 28.5 MPa and an increased MIT value of about 158,000 times. Thus, addition of a fluorinated nanodiamond to PFA clearly improved tensile strength and MIT.

The invention claimed is:

1. A fluororesin composition consisting of:
   a crystalline fluororesin; and
   a fluorinated nanodiamond,
   wherein the fluorinated nanodiamond is present in an amount of 0.01 to 5% by mass based on the fluororesin,
   wherein the fluororesin composition is obtained by kneading the fluororesin and the fluorinated nanodiamond at a temperature higher than a melting point of the fluororesin, and
   wherein the fluororesin is at least one selected from the group consisting of tetrafluoroethylene (TFE)/perfluoro(alkyl vinyl ether) (PAVE) copolymer, TFE/hexafluoropropylene (HFP) copolymer, TFE/ethylene (Et) copolymer, TFE/HFP/Et copolymer, TFE/HFP/vinylidene fluoride (VdF) copolymer, TFE/PAVE/chlorotrifluoroethylene (CTFE) copolymer, CTFE/Et copolymer, polychlorotrifluoroethylene, polyvinylidene fluoride and polyvinyl fluoride.

2. A molded product comprising the fluororesin composition according to claim 1.

3. The molded product according to claim 2, wherein the molded product has a recrystallized average spherulite size of 15 μm or smaller.

4. The molded product according to claim 2, wherein the molded product has a recrystallized average spherulite size of 6 μm or smaller.

5. The molded product according to claim 2, wherein the molded product has a recrystallized average spherulite size of 1 μm or smaller.

* * * * *